United States Patent [19]

Kubik

[11] Patent Number: 4,833,971

[45] Date of Patent: May 30, 1989

[54] SELF-REGULATED HYDRAULIC CONTROL SYSTEM

[76] Inventor: Philip A. Kubik, 1527 Lochridge, Bloomfield Hills, Mich. 48013

[21] Appl. No.: 165,762

[22] Filed: Mar. 9, 1988

[51] Int. Cl.⁴ ........................ F01B 29/04; F16D 31/02

[52] U.S. Cl. .......................................... 91/29; 91/511; 91/512; 91/519; 60/428; 60/430

[58] Field of Search ................. 91/28, 29, 32, 33, 511, 91/512, 519; 60/493, 428, 430

[56] References Cited

U.S. PATENT DOCUMENTS

| | | | |
|---|---|---|---|
| 3,104,591 | 6/1963 | Cudnohufsky | 91/519 |
| 3,279,484 | 10/1966 | Brinkel | 91/29 |
| 3,640,066 | 2/1972 | Marshall et al. | 91/519 |
| 3,744,375 | 7/1973 | Kubik | 91/411 A |
| 4,121,501 | 10/1978 | Finley | 91/519 |
| 4,164,119 | 8/1979 | Parquet | 60/430 |
| 4,565,116 | 1/1986 | Hehl | 91/519 |

FOREIGN PATENT DOCUMENTS

| | | | |
|---|---|---|---|
| 0073203 | 5/1982 | Japan | 60/430 |

*Primary Examiner*—Edward K. Look
*Assistant Examiner*—Thomas Denion
*Attorney, Agent, or Firm*—Basile and Hanlon

[57] ABSTRACT

A self-regulating hydraulic control circuit for controlling the flow of fluid to and from the cylinder of a double-acting hydraulic motor employs two pumps, one of which supplies fluid at a relatively high pressure and low displacement while the second pump is a relatively high displacement pump which operates only against a relatively low pressure requirement. The system is especially adapted for applications where, during a working stroke, the piston of the hydraulic motor moves from a start position through a first portion of the stroke during which the piston encounters but a minimal resistance to movement and then suddenly encounters a high resistance to movement. One example of such an application would be a press in which, at some point during the stroke of the piston, a tool carried by the piston initially encountered a workpiece. The control circuit is so designed that during the initial or free travel portion of the piston stroke, a low volume-high pressure pump is connected in a closed loop system via a directional control valve to two opposed faces of the piston which are of equal area. The high displacement pump is connected to act against a third face of the piston. The high volume of fluid supplied from the high volume pump will drive the piston rapidly through the free travel portion of its stroke. The increased pressure in the fluid circuit resulting from contact between a piston carried tool and a workpiece is employed to disconnect the high volume pump from the cylinder to avoid overloading the drive motor of that pump at the same time the high pressure pump is connected to apply pressure against the third face of the piston.

4 Claims, 1 Drawing Sheet

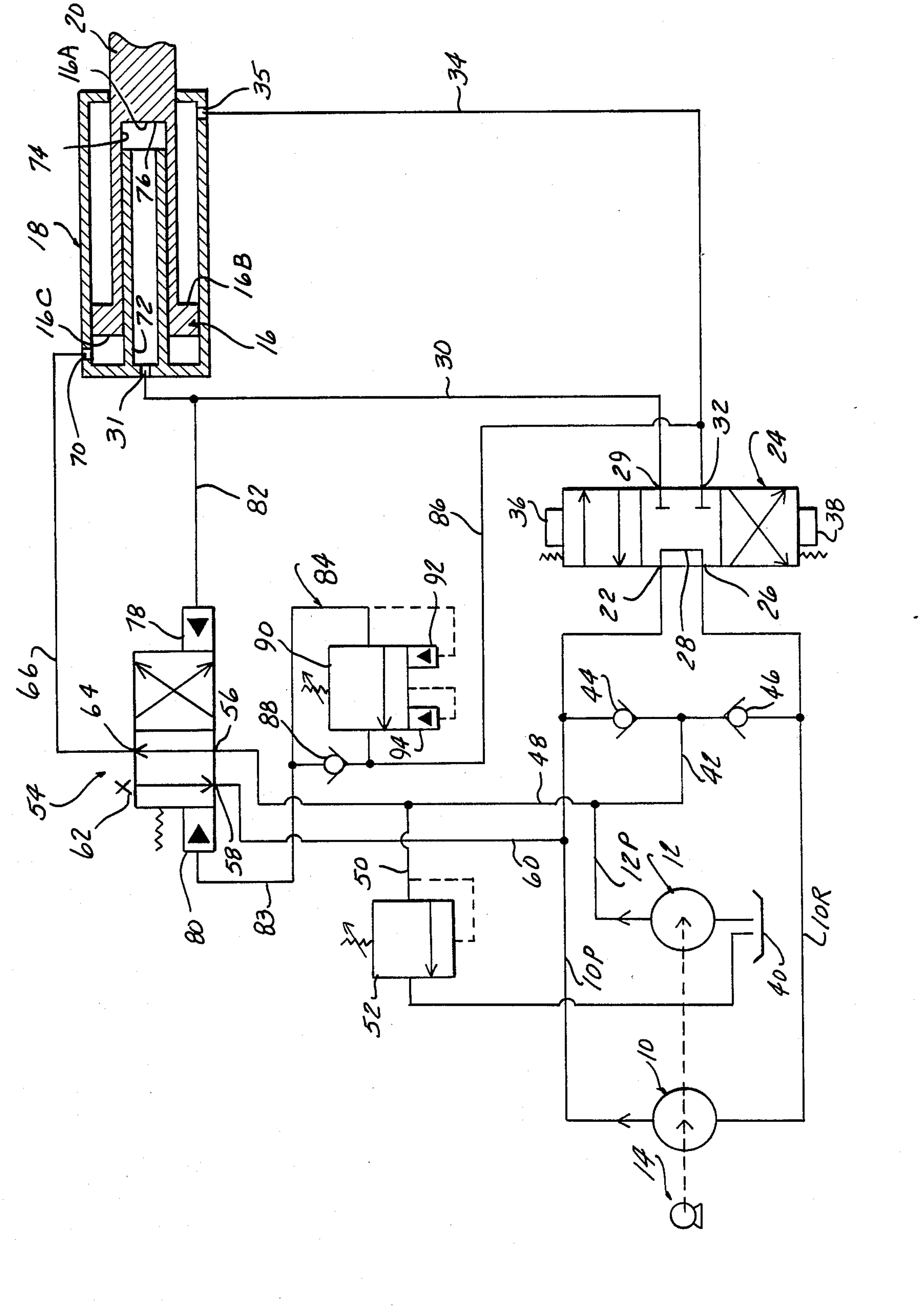
20
16A
35
34
74
76
18
16B
16C
72
16
30
70
31
32
29
24
82
86
36
38
84
92
22
26
28
90
44
46
66
64
56
88
94
48
42
54
62
58
60
12P
12
50
80
83
10R
10P
40
52
10
14

SELF-REGULATED HYDRAULIC CONTROL SYSTEM

BACKGROUND OF THE INVENTION

1. Field of the Invention

The present invention is directed to a self-regulating hydraulic control system employed to drive the piston of an hydraulic cylinder in a working cycle in which, during its working stroke, the piston moves against a minimal resistance during an initial or "free travel" portion of its extending stroke and then encounters a substantial resistance to further movement as, for example, in a punch press when the punch driven by the piston initially encounters the workpiece.

In such applications, of which a punch press is but one example, to minimize cycle time it is desirable to supply a high volume flow of fluid, which may be at a relatively low pressure, to the head end of the cylinder to drive the piston in rapid movement through the free travel portion of its working stroke to rapidly bring the tool or punch into contact with the work. Once the punch is engaged with the work, however, a substanial increase in pressure applied to the head end of the cylinder will be required to drive the punch through the work. This phase of the working stroke may be most efficiently accomplished, from the standpoint of the power requirement, by a pump which discharges a relatively low volume of fluid at a relatively high pressure. Where a single pump is employed to drive a piston in such a working stroke, the tonnage required during the working portion of the stroke will impose a compromise between minimizing cycle time and minimizing the horsepower requirements for the motor which drives the pump.

2. Description of the Prior Art

This problem has been recognized in the prior art and has resulted in various so called "high-low" systems which, by employing two pumps acting in conjunction with each other during the free travel portion of the piston stroke, achieve relatively rapid cycle times with a power requirement which is but a fraction of the power requirement of a single pump system. In such systems, the main pump, which will power the cylinder during the working portion of its stroke, is a relative low volume pump which can produce the desired tonnage with a relatively low power input requirement. The second pump is a relatively high volume pump which, when driven by the same motor which drives the main pump, will put out a relatively high volume of fluid at a relatively low pressure. Typically, the system is so designed that both pumps supply fluid to the cylinder during the free travel portion of the piston stroke and the output of the high volume pump is diverted from the cylinder during the working portion of the piston stroke. Such systems typically disconnect the output of the high volume pump from the working circuit by mechanically or electrically actuated valves which, in turn, rely upon pressure switches, limit switches, cams, etc., to control their actuation. These systems, in general, have proven difficult to maintain and troubleshooting is frequently complicated by the initial problem of determining whether the fault lies with the mechanical, electrical or hydraulic components of the system.

The present invention is directed to a two-pump system in which the system is self-regulating in response to its own internal operating pressures.

SUMMARY OF THE INVENTION

A system embodying the present invention employs a fluid pressure actuated single rod piston-cylinder assembly. Such assemblies are known in the art, see, for example, U.S. Pat. No. 3,744,375. The cylinder and piston are so constructed as to provide three separate fluid chambers within the cylinder with three separate faces on the piston respectively exposed to the three chambers. Fluid contained in a first and a second of the chambers works against respective first and second faces of the piston, the first face being a head end face and the second face being a rod end face. These first and second faces are of equal area and, thus, may be hydraulically connected in a closed loop system via a conventional four-way valve to the intake and discharge outlet of a fluid pump. In the disclosed system, the third face of the piston is a head end face and the third chamber of the piston may be selectively connected to the discharge outlet of either of a high volume-low pressure pump or a low volume-high pressure pump. The low volume-high pressure pump, during operation, is connected via the aforementioned four-way valve to the first and second chambers throughout the entire range of movement of the piston.

During the initial free travel portion of the extending stroke of the piston, the outlet of the high volume-low pressure pump is connected to the third chamber via a two-position dual pilot operated valve. During this portion of the stroke, the piston encounters but a minimal resistance to movement and the high volume of fluid supplied to the cylinder by the high volume pump drives the piston at a relatively rapid rate of movement during the free travel portion of the extending piston stroke. When the piston encounters a substantially increased resistance to extending movement, as when a tool carried by the piston engages a stationary workpiece, this increased resistance generates a dramatically increased pressure in the first chamber of the cylinder. Pressure in the first chamber of the cylinder is applied to one pilot of the dual position valve. The opposite pilot of the two-position valve is connected via a fluid circuit to communicate with the second chamber of the piston. This latter fluid circuit includes a one-way check valve oriented to accommodate flow in a direction from the second chamber toward the opposed pilot and to block flow of fluid from the second pilot to the second chamber. The pressure applied to the first pilot is opposed by whatever pressure exists in the second pilot. To release pressure from the second pilot, the fluid circuit includes a dual stage sequence valve connected in parallel bypassing relationship to the one-way check valve. The dual stage valve is operable to remain in a closed position until pressure within the second pilot rises above a preselected relatively high pressure. Once the dual stage valve is opened by this relatively high pressure, it will be maintained open until the pressure in the second pilot falls to a pressure substantially below the pressure required to initially open the valve. With the foregoing arrangement, the initial opening pressure of the dual stage valve is set to substantially exceed the pressure in the second chamber of the cylinder during the free travel portion of the piston stroke. When the piston encounters a relatively high resistance to further movement, as by the engagement of a tool with a workpiece, the increased pressure in the second chamber rises to a pressure greater than that required to open the dual stage valve, and opening of the dual stage valve shifts the valve to disconnect the high volume pump from the cylinder and to connect the output of the low volume-high pressure pump to the third chamber. Thus, when the piston encounters a high resistance to further extending movement, the output of the high pressure pump is applied to the third chamber of the cylinder to substantially increase the force exerted by the piston.

Other objects and features of the invention will become apparent by reference to the following specification and to the drawings.

IN THE DRAWINGS

The single FIGURE of drawings shows a schematic diagram of a hydraulic control system embodying the present invention.

DESCRIPTION OF THE PREFERRED EMBODIMENT

The system shown in the drawings includes a main pump, designated generally 10, and a second pump, designated generally 12, both of which are driven by a power source, such as an electric motor, designated generally 14. Pumps 10 and 12 effectively operate as constant displacement pumps whose power requirements are directly proportional to the pressure requirements of the system to be driven by the pump. However, in many applications, main pump 10 preferably is a variable displacement pump provided with a control which will vary its displacement to provide appropriate acceleration and deceleration of the driven piston at the start and end of the piston stroke to prevent a shock loading of the hydraulic circuit. Except for these relatively short periods of increasing and decreasing displacement at the start and finish of each cycle, the pump operates at a constant maximum displacement.

In the present system, pumps 10 and 12 are employed to drive the piston 16 of a single rod hydraulic cylinder 18 in an application where the piston rod 20, when driven in a working stroke in which the rod is extended from cylinder 18, will move against a minimal resistance during the initial portion of the stroke and, at some time before the completion of the extending stroke, will encounter a high resistance to further extending movement. A typical example of such an application is a punch press in which a punch carried by the piston rod will be driven from a retracted position into contact with a workpiece and then driven through the workpiece. In order to drive the punch through the workpiece, the system pump must be capable of supplying fluid at a relatively high pressure, of the order of 2,000 PSI, for example, while pressures of this magnitude are obviously not required to drive the piston during the free travel portion of its stroke before the punch engages the workpiece. Because the horsepower requirement of the motor which drives the pump is directly proportional to the product of the pump displacement and pump output pressure, where a high output pressure is required, cost considerations normally will dictate the use of a relatively low displacement pump to avoid an unreasonably high horsepower requirement for the motor employed to drive the pump. Conversely, in the punch press example referred to above, during the free travel portion of the working stroke, a relatively low pressure, of the order of 150 PSI, for example, will be adequate to drive the piston. During this portion of the piston stroke, a relatively large displacement pump could be employed without imposing an unreasonable power requirement upon the pump drive motor. To minimize cycle time, it would be desirable to drive the piston relatively rapidly through the free travel portion of its stroke.

Accordingly, in the system shown in the drawings, pump 10 is intended to be capable of applying the maximum pressure required by the piston and, thus, to achieve a reasonably low power requirement, will be a relatively low displacement pump. Pump 12, on the other hand, is intended to supply a relatively high volume of fluid at a relatively low pressure. The two pumps work in conjunction during the free travel portion of the stroke, while only pump 10 supplies pressure to the piston during the working portion of the stroke. The system is so designed as to automatically regulate itself to achieve the foregoing result.

As shown in the drawings, the pressure or outlet side of main pump 10 is connected by a pressure conduit 10P to the pressure port 22 of a three-position four-way valve, designated generally 24, while the return port 26 of valve 24 is connected via a return conduit 10R to the intake of pump 10. With valve 24 centered, as shown in the drawings, an internal passage 28 in valve 24 connects ports 22 and 26 to each other so that pump 10 may idle between working cycles. At the opposite side of valve 24, control port 29 of the valve is connected via a head end conduit 30 to a head end port 31 of cylinder 18 while the second control port 32 of valve 24 is connected via rod end conduit 34 to a rod end port 35 of cylinder 18. With the valve 24 in the centered position shown, control ports 29 and 32 are blocked within valve 24.

Valve 24 is normally spring centered and is provided in a well known manner with actuators 36, 38 which are operable to shift the valve from its centered position to either of its two operating positions to drive piston 16 in an extending stroke when the straight-through connections of valve 24 are aligned with the ports or to retract piston 16 when the cross connections of valve 24 are aligned with the valve port. Actuators 36, 38 may take any of several conventional forms, the particular application of the system generally determining whether solenoid actuated, pilot operated, or mechanical shifting would be preferable. It is believed apparent that pump 10, valve 24 and the conduits connecting pump 10 to cylinder 18 via valve 24 constitute a closed loop system.

The hydraulic motor constituted by the piston-cylinder assembly 16–18 is shown and described in detail in my earlier U.S. Pat. No. 3,744,375. The piston is formed with three working faces 16A, 16B, 16C, each exposed to hydraulically separate chambers within cylinder 18. Piston faces 16A and 16B are of equal area and are on hydraulically opposite sides of the piston. This arrangement enables the faces 16A and 16B to be incorporated in a closed loop system. Face 16C serves a dual purpose function during the working (extending) stroke of piston 16 which will be described in greater detail below.

One function of second pump 12 in the system shown is to operate as a charge pump which functions to charge and supply additional fluid, as required, to the closed loop system constituted by pump 10, valve 24 and cylinder 18. The intake of pump 12 is connected to a sump or tank 40 which maintains a supply of fluid at all times. The pressure side or outlet of pump 12 is connected to a conduit 12P which, in turn, is connected via a branch conduit 42 to supply fluid to the main pump circuit as required via one-way check valves 44, 46. Outlet conduit 12P also feeds a second branch conduit 48 which is connected via a conduit 50 to a relief valve 52 whose outlet is connected to the sump or tank 40. Valve 52 is normally spring biased to a closed position and is set to open when the pressure at the outlet side of pump 12 exceeds a predetermined pressure. Typically, in the system shown, valve 52 will be set to open at 150 PSI and, in the circuit shown in the drawings, this means that a minimum pressure of 150 PSI will be maintained at the intake side (conduit 10R) of main pump 10.

The circuit shown also includes a two-position double-pilot operated valve, designated generally 54. At the lower side of valve 54, as shown in the drawings, a first port 56 is connected to the pressure conduit 12P of pump 12 by conduit 48, while a second port 58 of valve 54 is connected by a conduit 60 to the pressure conduit 10P of pump 10. At the opposite side of valve 54, one port 62 is plugged, while the other port 64 is connected via a flow conduit 66 to a port 70 at the head end of cylinder 18.

Referring now to cylinder 18, it is seen that the cylinder includes a hollow open-ended tube 72 projecting axially into the interior of cylinder 18 from the head end of the cylinder. Tube 72 is slidably and sealingly received within a blind bore 74 which extends axially from the head end face of piston 16 into the piston rod to terminate at a blind end 76 which constitutes face 16A of the piston. The area of blind end 76 is equal to that of the rod end face of the piston. The left hand end of tube 72, as viewed in the drawings, is sealed to the head end of the cylinder, and port 70 opens through the head end of the cylinder into the interior of tube 72.

Returning now to valve 54, opposed pressure responsive pilots 78, 80 are employed to shift the valve between its two positions. The valve is normally spring biased to the position shown in the drawings in which the output of pump 12 passes through the valve from port 56 to port 64 and thence via port 70 to act against face 16C of piston 16. As stated above, valve 52 constantly maintains the output pressure of pump 12 at the relief setting of valve 52, for example, 150 PSI, thus with the connections as shown in the drawings, a pressure of 150 PSI would be exerted against face 16C of the piston, urging the piston to move to the right as viewed in the drawings. However, such movement of piston 16 is not permitted at this time because rod end conduit 34 is blocked at four-way valve 24 so that fluid within cylinder 18 acting against face 16B of the piston cannot be expelled via rod end conduit 34 to accomodate the rightward movement of the piston.

Pilot 78 of valve 54 is connected via a conduit 82 to head end conduit 30 of cylinder 18, while the opposite pilot 80 is connected via a conduit 83, control circuit 84 and conduit 86 to rod end conduit 34 of cylinder 18. Pilots 78 and 80 act in well a known manner to position valve 54. The pilots act in direct opposition to each other. If, for example, pressure is applied to pilot 78 to shift the valve to the left from the position shown, shifting movement of the valve can occur only if fluid is permitted to flow away from the opposite pilot 80. In the configuration shown in the drawing, flow from pilot 80 away from the pilot through conduit 83 is blocked within circuit 84 at a one-way check valve 88 and will also be blocked at a normally closed dual-stage pilot operated sequence valve 90 connected in circuit 84 in parallel bypassing relationship to check valve 88.

Dual-stage valve 90 is a commercially available valve which can be set to open in response to the application of a selected relatively high pressure to pilot 92, but, once open, will remain open as long as the pressure in pilot 80 exceeds a selected, substantially lower pressure, which is applied to pilot 94.

OPERATION

Prior to the commencement of a working cycle, piston 16 will be at its left hand end limit of movement-that is, with its piston rod retracted into cylinder 18, as shown in the drawings. Motor 14 will be driving both main pump 10 and the second pump 12 with the main directional control valve 24 in the centered position shown in the drawing. Pilot operated valve 54 and valve 90 will likewise be in the position shown in the drawings. With the various valves in the positions described above, main pump 10 will idle to continuously recirculate fluid from its outlet side through pressure conduit 10P to port 22 of valve 24, thence through the centered valve to port 26 and back to the intake of pump 10 via return conduit 10R.

At this time, the output of pump 12 passes through conduit 12P and conduit 48 to port 56 of valve 54. At this time, port 56 of valve 54 is connected to port 64 so that the output of pump 12 flows through valve 54 and conduit 66 through port 70 of cylinder 18 to act against face 16C of the piston. This pressure applied against face 16C urges piston 16 to move to the right from the position shown in the drawings. However, this movement cannot occur because piston 16 is locked in the position shown due to the fact that its rod end 34 and head end conduits 30 are blocked at directional control valve 24 so that no displacement of piston 16 can occur. The pressure developed by the output of pump 12 against face 16C of the piston will back up through conduit 66, valve 54 and conduits 48, 50 to open valve 52 to connect the output of pump 12 to its sump 40 to recirculate fluid through the circuit 12P, 48, 50, 52, sump 40 and the intake of pump 12, while maintaining a pressure in conduit 12P determined by the setting of valve 52. This pressure may typically be selected as 150 PSI.

For purposes of explanation, it will be assumed that during a working stroke of piston 16, the piston will be extended from the cylinder to move a tool driven by the piston into engagement with a workpiece and then drive the tool in a punching stroke through the workpiece. During the initial portion of the stroke, the piston encounters minimal resistance to its movement until the tool engages the workpiece. When the tool engages the workpiece, the resistance to further movement of the piston drastically increases. In the system shown, main pump 12 is relied upon to supply sufficient pressure to cylinder 18 to drive the tool through the workpiece. The pressure required for this purpose will depend upon many factors, such as piston area, the material of the workpiece, etc., but will, in any event, obviously be much greater than the pressure required to drive the piston during the initial "free travel" portion of its stroke before the tool engages the workpiece. If, for example, the pressure required to drive the tool through the workpiece is 2,000 PSI, standard design tables show that 2,000 PSI can be developed by a pump having a displacement of 3.5 gallons per minute when the pump is driven by a 4.8 horsepower motor.

In a typical press, the application of high pressure is required only during the final portion of the working stroke, and typically, only over a relatively small portion of the total stroke.

The pump displacement of a constant displacement pump which can supply the maximum required pressure when driven by a motor of reasonably limited horsepower cannot drive the piston any faster during the free travel portion of the piston stroke than it can during the working portion of the stroke, and hence may have an undesirably high cycle time.

In the present system, the second pump 12 takes the form of a relatively high volume displacement pump which, because it is not required to supply a relatively high pressure (maximum of 200 PSI, for example) has a reasonably low horsepower requirement. A pump which can supply 18 gallons per minute at 200 PSI, requires a drive motor of only approximately 2.5 horsepower. As noted above, in the present system, the output of pump 12 has a pressure relief valve 52 which opens at 150 PSI.

To commence a working cycle, directional control valve 24 of the system is actuated to shift that valve from the centered position shown in the drawing to a position where the straight through connections of the valve are aligned with the ports to connect port 22 to port 29 and to connect ports 26 and 32 to each other. This actuation, as described above, may be by any of several well known and conventional control arrangements chosen in accordance with the particular application of the system.

With the straight through connections of valve 24 aligned with the valve ports, the pressure conduit 10P of pump 10 is connected through valve 24 to head end conduit of cylinder 18, while the rod end conduit 34 of cylinder 18 is connected through valve 24 to the intake of pump 10 via return conduit 10R. With these connections established, piston 16 will be driven to the right from the position shown in the drawing. During this initial portion of the "free travel" of piston 16, only a relatively small pressure is required to move the piston.

At this time, pilot operated valve 54 is in the position shown in the drawing and the output of pump 12 acts via port 70 to apply pressure against face 16C of piston 16 to assist in driving the piston to the right. As stated above, pump 12 is chosen as a high displacement pump having an output, for example, of approximately 18 gallons per minute, and this relatively high flow rate accommodates relatively rapid movement of piston 16 to the right through the free travel portion of its stroke. During the free travel portion of the stroke of piston 16, pressure in head end conduit 30 is applied to pilot 78 of the pilot actuated valve 54 tending to shift the valve from the position shown in the drawings. However, the opposing pilot 80 is blocked at this time by one-way check valve 88 and the closed dual-stage valve 90. Essentially, the pressure in line 82 applied to pilot 78 is transmitted via the movable valve member to the opposing pilot 80 and the pressure in line 83 leading from pilot 80 is the same as the pressure in line 82 and head end conduit 30. With the pressure thus equalized, the spring loading of valve 54 maintains the valve in the position shown. The setting of pilot 92 of dual-stage valve 90 is substantially higher than the pressure which exists in line 83 at this time and, thus, valve 90 remains closed.

At the conclusion of the free travel portion of the stroke of piston 16, its tool engages the work and the increase of resistance to movement of the piston to the right results in a consequent build-up in the pressure in head end conduit 30. The same increased pressure is applied via conduit 82 to pilot 78, which, in turn, increases the pressure within pilot 80 until the pressure in conduit 83 overcomes the setting of pilot 92 to enable the pilot to shift valve 90 to its conducting position. Once valve 90 has been so opened, its second pilot 94 will retain valve 90 in its open position even if the pressure in line 83 drops substantially below the setting of pilot 92. A pressure drop normally will be encountered in a punching operation once the punch has started cutting through the workpiece. Pressure in conduit 83 is thus vented through valve 90 to the return side of pump 10 via conduit 86, valve 24 and return conduit 10R.

The dumping of pressure from pilot 80 permits pilot 78 to shift valve 54 from the position shown in the drawings to establish a connection between ports 58 and 64 of valve 54 while connecting the output of pump 12 at port 56 to the blocked port 62 of valve 54. This effectively disconnects pump 12 from cylinder 18 and connects the high-pressure low-displacement pump 10 to port 70 so that the high pressure output of pump 10 is now applied both to face 16A of piston 16 and to face 16C. Maximum pressure is thus applied to both head end faces of the piston, although the speed of movement of the piston is now substantially reduced because of the relatively low displacement of pump 10.

With the output of pump 12 plugged at port 62 of the valve 54, pressure relief valve 52 is opened to return the output of pump 12 to its sump.

At the conclusion of the working stroke of the piston, valve 24 is shifted by actuation of actuator 38 to place the cross connections of the valve in alignment with its ports. The output of main pump 10 now flows from the pump through conduit 10P, ports 22 and 32 of valve 24 and rod end conduit 34 to the rod end of cylinder 18, while the head end of cylinder 18 is connected via conduit 30, ports 29 and 26 and return conduit 10R to the intake of pump 10 to drive the piston in retracting movement — i.e., to the left as viewed in the drawing. Rod end conduit 34 is now the high pressure side of the circuit, and the pressure in rod end conduit 34 is applied via conduit 86, one-way check valve 88 and conduit 83 to pilot 80 of valve 54. The opposing pilot 78 is connected via line 82 to head end conduit 30 which is now the low pressure side of the circuit of pump 10. The pressure applied to pilot 80 from rod end conduit 34 is thus operable at this time to shift valve 54 back to the position shown in the drawings, since fluid can flow directly from pilot 78 to the low pressure side of pump 10.

Fluid exposed to face 16A of the piston can now discharge through ports 70, conduit 66, ports 64 and 56 and, thence, via conduits 48, 50 and valve 52 to the intake side or sump 40 of pump 12. Although pump 12, at this time, is attempting to pump fluid to port 70 of cylinder 18, the pressure applied to face 16B of the piston 16 by main pump 10 is much higher and the setting of valve 52 is overcome easily to accommodate the discharge of fluid from port 70 into the sump of pump 12. The relatively small area of face 16B of piston 16 enables a reasonably rapid rate of movement of the piston 16 during its retracting stroke.

While one embodiment of the invention has been described in detail, it will be apparent to those skilled in the art that the disclosed embodiment may be modified. Therefore, the foregoing description is to be considered exemplary, rather than limiting, and the true scope of the invention is that defined in the following claims.

What is claimed is:

1. In a hydraulic system including main fluid pump means having an intake and an outlet for pumping a relatively low volume of fluid at a relatively high pressure from said outlet, a reciprocatory fluid motor including a cylinder having a head end port and a rod end port and a piston including a rod projecting from the rod end of said cylinder, and directional control valve means for operatively connecting the intake and outlet of said main pump means to said rod end and head end ports in a closed loop system to selectively extend or retract the piston rod relative to said cylinder;

the improvement comprising second fluid pump means having an intake connected to a sump and an outlet for discharging a relatively high volume of fluid at a relatively low pressure from its outlet, second valve means operable in a first position to connect the outlet of said second pump means to the head end of said cylinder and operable in a second position to connect the outlet of said main pump means to the head end of said cylinder, first pilot means for urging said second valve means toward said first position in response to pressure applied to said first pilot means, second pilot means for urging said second valve means toward said second position in response to pressure applied to said second pilot means, said first and second pilot means acting in opposition to each other such that movement of said second valve means can occur only when the pressure applied to one pilot means exceeds the pressure applied to the other, first conduit means for placing said first pilot means in fluid communication with said rod end port, second conduit means placing said second pilot means in communication with said head end port, said first conduit means including a one-way check valve accommodating flow of fluid only toward said first pilot means, normally closed valve means connected in said first conduit means in parallel with said one-way check valve for accommodating flow of fluid away from said first pilot means to relieve the pressure applied to said first pilot means when the pressure in said first pilot means exceeds a preselected relatively high pressure, said normally closed valve means including third pilot means for opening said normally closed valve means when the pressure applied to said first pilot means exceeds said preselected relatively high pressure, and fourth pilot means operable when said normally closed valve means is open for maintaining said normally closed valve means open independently of said first pilot means.

2. The invention defined in claim 1 further comprising pressure relief means operatively connected to the outlet of said second pump means for venting said outlet to said sump when the pressure at said outlet exceeds a preselected relatively low pressure.

3. In a "high-low" hydraulic circuit for rapidly advancing the piston of a hydraulic motor means from a rest position during a first portion of a working stroke until an increased resistance to movement of the piston is encountered and subsequently driving the piston at a lower speed against the increased resistance to complete said working stroke, said system including a first relatively low-displacement, high-pressure pump having an intake and an outlet, a second relatively high-displacement, low-pressure pump having an intake and an outlet, and hydraulic circuit means for connecting said first and second pump means to said fluid motor means to drive said piston through said working stroke and to subsequently rapidly return said piston to said rest position;

the improvement wherein said hydraulic motor means includes a cylinder having a piston operatively mounted therein for reciprocatory movement and having a rod projecting from a rod end of the cylinder, means on said cylinder and piston defining first, second and third working faces on said piston respectively exposed to first, second and third hydraulically separate chambers within said cylinder, said first and second faces being of equal area and facing opposite ends of said cylinder and said third face facing in the same direction as said first face and having an area greater than that of said first face, first, second and third ports in said cylinder communicating respectively with said first, second and third chambers;

and said hydraulic circuit means comprises a multi-position reversing valve controlled first circuit means for connecting the intake and outlet of said first pump to said first and second ports of said motor means in a closed-loop circuit to selectively enable said first pump to drive said piston in a working stroke from said rest position or a return stroke to said rest position in accordance with the position of said reversing valve, second circuit means including a pilot actuated, two-position valve operable in a first position to connect said third port to the outlet of said first pump and operable in a second position to connect said third port to the outlet of said second pump, said two-position valve including opposed first and second pressure actuated pilots operable to position said two-position valve in its first position when the pressure in said first pilot exceeds the pressure in said second pilot and to position said two-position valve in said second position when the pressure in said second pilot exceeds the pressure in said first pilot, first conduit means in said second circuit means connecting said second pilot to said first port, second conduit means in said second circuit means connecting said first pilot to the intake side of one of said pumps, a dual-stage, pilot-actuated sequence valve in said second conduit means operable to maintain a normally closed position blocking flow from said first pilot until the pressure in said first pilot rises above a selected first pressure at which said sequence valve opens and to remain open until the pressure in said first pilot drops below a second pressure substantially less than said first pressure, and a one-way check valve connected in said second conduit means in parallel with said sequence valve accommodating flow toward said first pilot.

4. The invention defined in claim 3 further comprising pressure relief valve means connected to the outlet of said second pump, and replenishing means for connecting the outlet of said second pump to the intake of said first pump.

* * * * *